(12) United States Patent
Richardson et al.

(10) Patent No.: US 8,331,284 B2
(45) Date of Patent: Dec. 11, 2012

(54) METHOD OF ASSIGNING TRAFFIC RESOURCES TO ONE OR MORE ACCESS TERMINALS

(75) Inventors: Thomas Richardson, South Orange, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1085 days.

(21) Appl. No.: 12/041,627

(22) Filed: Mar. 3, 2008

(65) Prior Publication Data

US 2009/0219856 A1    Sep. 3, 2009

(51) Int. Cl.
*H04Q 7/00* (2006.01)
(52) U.S. Cl. ........................................ 370/328
(58) Field of Classification Search .................... 370/328
See application file for complete search history.

(56) References Cited

U.S. PATENT DOCUMENTS

| | | | |
|---|---|---|---|
| 5,563,883 A * | 10/1996 | Cheng | 370/449 |
| 7,484,136 B2 * | 1/2009 | Qiu | 714/704 |
| 7,684,372 B2 | 3/2010 | Beale et al. | |
| 2004/0114566 A1 * | 6/2004 | Lim et al. | 370/349 |
| 2005/0157670 A1 * | 7/2005 | Tang et al. | 370/320 |
| 2005/0256926 A1 * | 11/2005 | Muhonen et al. | 709/205 |
| 2006/0018336 A1 | 1/2006 | Sutivong et al. | |
| 2008/0014951 A1 | 1/2008 | Laroia et al. | |
| 2008/0022162 A1 | 1/2008 | Qiu | |

OTHER PUBLICATIONS

International Search Report and Written Opinion—PCT/US2009/035853, International Search Authority—European Patent Office—Jul. 23, 2009.

* cited by examiner

*Primary Examiner* — Sulaiman Nooristany
(74) *Attorney, Agent, or Firm* — Donald C. Kordich

(57) ABSTRACT

A communication system receives attributes associated with access terminals within a cell and groups them in accordance with similarities between the received attributes. Resource assignment messages customized to their respective attributes are transmitted to the groups, thereby ensuring that all groups receive these messages. These groups are formed dynamically as the attributes of the access terminals vary when they traverse through a cell.

50 Claims, 12 Drawing Sheets

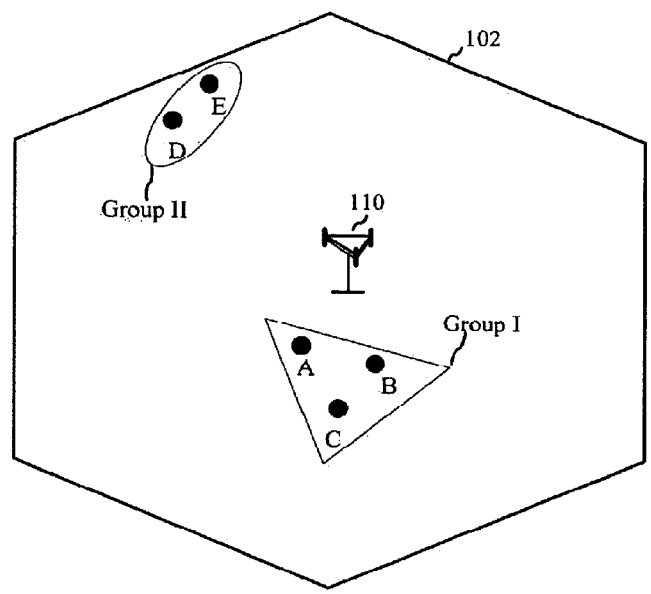
FIG. 5A
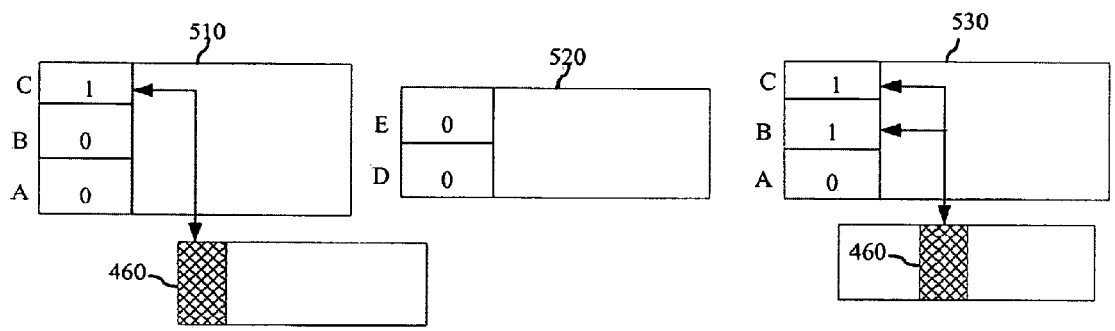
FIG. 5B  FIG. 5C

METHOD OF ASSIGNING TRAFFIC RESOURCES TO ONE OR MORE ACCESS TERMINALS

BACKGROUND OF THE INVENTION

Wireless communication systems are widely deployed to provide various types of communications such as for example voice, data, video, etc. These systems may be multiple-access systems capable of supporting communication with multiple access terminals by sharing available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems or hybrids involving at least two of these systems. Typically, a wireless communication system comprises several base stations, wherein each base station communicates with a mobile station using a forward link and each mobile station (or access terminal) communicates with base station(s) using a reverse link.

When a user generates data for transmission, a service request is conveyed to the base station or access point (AP) via established communication channels and in turn the base station assigns resources contingent upon time, bandwidth requirements/availability or service options of the user. Upon servicing an existing user, the traffic resources are recycled by re-assigning them to other users. The information regarding assignment of resources is broadcast to users within a cell, by an AP servicing the cell. The access terminals (ATs) associated with the users decode such messages from the AT in order to obtain information regarding assignment of traffic resources. However, various factors such as power constraints, signal attenuation, obstacles, etc. can lead to different users receiving respective messages with different strengths. Additionally, some of the access terminals may not receive the messages at all. Accordingly, such access terminals will not be able to make optimal use of resources assigned thereto.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A method of communication according to various aspects described herein provides for an access point to receive one or more attributes associated with access terminals within its cell. The attributes can relate to signal to noise ratio (SNR) information of the terminals. The access terminals are grouped into one or more groups based on similarity of attributes. Resource assignment messages customized to these attributes are then transmitted to each group—this facilitates that all respective groups receive resource assignment messages while optimizing utilization of respective resources.

Another aspect is associated with an apparatus for conveying resource assignments information within a communication system. The apparatus comprises a receiver that receives one or more attributes of access terminals within a cell that are serviced by a base station/access point. A memory associated with the apparatus facilitates storing the received attributes along with information regarding assignment of resources to the one or more access terminals. The apparatus also comprises a process that generates a signal grouping the access terminals into one or more groups based on similarity of the received attributes.

Another embodiment relates to a computer readable medium with computer executable instructions for grouping a number of access terminals based on similarity of attributes received from the access terminals. The medium also comprises instructions for transmitting resource assignment messages to such groups. The instructions facilitate customizing the resource assignment messages to respective groups based on the attributes received from them.

In accordance with another aspect, a system for receiving resource assignment information is disclosed. It comprises means for transmitting one or more attributes associated with an access terminal. It also comprises means for associating the access terminal with a group based on similarity of the transmitted attributes and means for receiving resource assignment messages which are customized to the attributes of a group the access terminal is associated therewith. Another aspect relates to an apparatus for receiving resource assignment information within a communication system. It comprises a transmitter that transmits one or more attributes of an access terminal within a cell serviced by an access point. An associated memory stores one or more of the transmitted attributes or assignment information that has been received from the access point. The system further comprises a processor that generates a signal that associates the access terminal with a group based on similarity of the transmitted attributes.

In accordance with an aspect, the resource assignment messages transmitted to the groups can comprise bit masks. Terminals belonging to a group receive a bit mask that comprises resource assignment information associated with the terminals. Accordingly, each group of access terminals can receive a bit mask comprising as many bits as the number of access terminals within the group. The value of bits within the bit mask can signal resource assignments to the terminals.

In accordance with a different aspect, the access point detects presence of a new terminal within the cell and receives attributes associated with the new terminal. These attributes are compared to attributes of currently existing groups within the cell. If the attributes of the new terminal are similar to any of those currently existing groups, the new terminal is included into the group that best matches its attributes and a new resource assignment message is transmitted to the group. If the attributes of the new terminal do not match any of the currently existing groups, a new group is created and the terminal is included into it.

In accordance with another aspect, groups of access terminals within a cell can be formed dynamically based on the received attributes. The communication system can constantly monitor attributes of access terminals within its cell to detect variations. A threshold for the received attributes can be associated with each group. If the attributes associated with a terminal belonging to a particular group vary beyond the threshold associated with the group, it is determined that the terminal can no longer belong to the group as it may not receive the resource assignment message transmitted to the group. The attributes of such a terminal are compared to attributes of other groups that may exist within the cell in order to determine if the terminal can be associated with any of the other groups. If the attributes of the access terminal are found to be similar to another group, the terminal is associated with the group and a resource assignment message comprising information regarding assignment of resources to the terminal is transmitted to the group. On the other hand, if the attributes of the terminal do not match those of any other currently existing group, a new group comprising the terminal is formed and a resource assignment message customized to the attributes of the terminal is transmitted.

In accordance with yet another aspect, an access terminal requesting resources transmits its attributes such as SNR to a serving base station or an access point. Based on the transmitted attributes, the access terminal can be associated with an existing group within a cell or it can be associated with a new group. Accordingly, it receives resource assignment messages signaling to it which resources, if any, have been assigned. The resource assignment message can be a bit mask that comprises bits corresponding to the number of access terminals in the group comprising the requesting terminal. Upon receiving the bit mask, the requesting terminal decodes it and determines if any resources have been assigned to it based upon value of the bit associated with it in the bit mask.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

BRIEF DESCRIPTION OF THE DRAWINGS

FIG. 5A shows a diagram of a cell with an AP servicing multiple users according to another aspect.

FIG. 5B illustrates a schematic diagram of bit masks transmitted to users within a cell.

FIG. 5C illustrates a schematic diagram of another bit mask transmitted to users within a cell.

DESCRIPTION OF THE INVENTION

Figure 1:
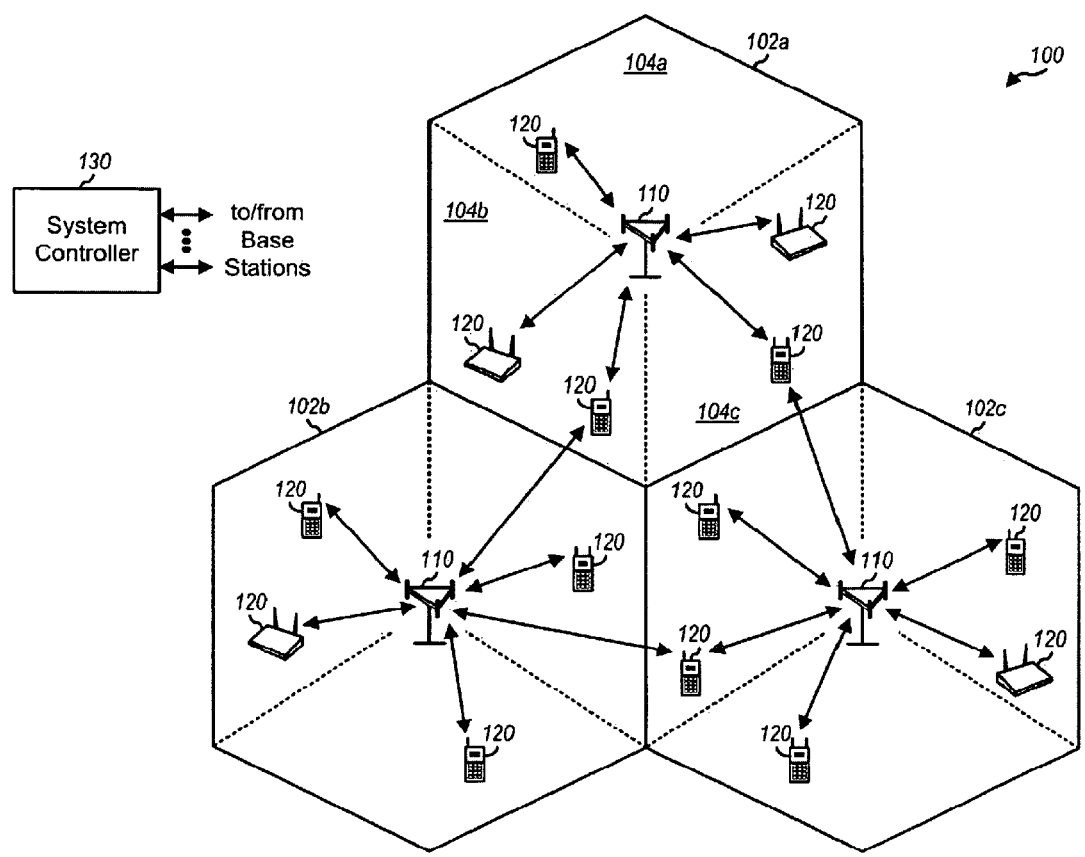
FIG. 1 illustrates a wireless multiple-access communication system in accordance with various aspects set forth herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

Various aspects can incorporate inference schemes and/or techniques in connection with transitioning communication resources. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, various aspects are described herein in connection with a subscriber station. A subscriber station can also be called a system, a subscriber unit, mobile station, mobile, remote station, access point, remote terminal, access terminal, user terminal, user agent, a user device, mobile device, portable communications device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 illustrates a wireless communication system 100 with multiple access points (APs) 110 and multiple terminals 120. Each access point 110 provides communication coverage for a particular geographic area 102. The term "cell" can refer to an access point and/or its coverage area depending on the context in which the term is used. To improve system capacity, an access terminal coverage area may be partitioned into multiple smaller areas, e.g., three smaller areas 104a, 104b, and 104c. Each smaller area is served by a respective base transceiver subsystem (BTS). The term "sector" can refer to an AP and/or its coverage area depending on the context in which the term is used. For a sectorized cell, the APs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell. A base station is a station that communicates with the terminals. A base station may also be called, and may contain some or all of the functionality of, an access point, a Node B, and/or some other network entity.

Terminals 120 are typically dispersed throughout the system, and each terminal may be fixed or mobile. A terminal may also be called, and may contain some or all of the functionality of, a mobile station, user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, system controller 130 couples to APs 110 and provides coordination and control for these base stations. System controller 130 may be a single network entity or a collection of network entities. For a distributed architecture, the APs may communicate with one another as needed. In some aspects, the system may support multiple protocols such as CDMA and OFDMA, which may be used alternately for both RL and FL transmission, or for only one or the other. In addition, in OFDMA communication system one or more ATs may support a CDMA reverse link, along with or in lieu of an OFDM reverse link.

Figure 2:
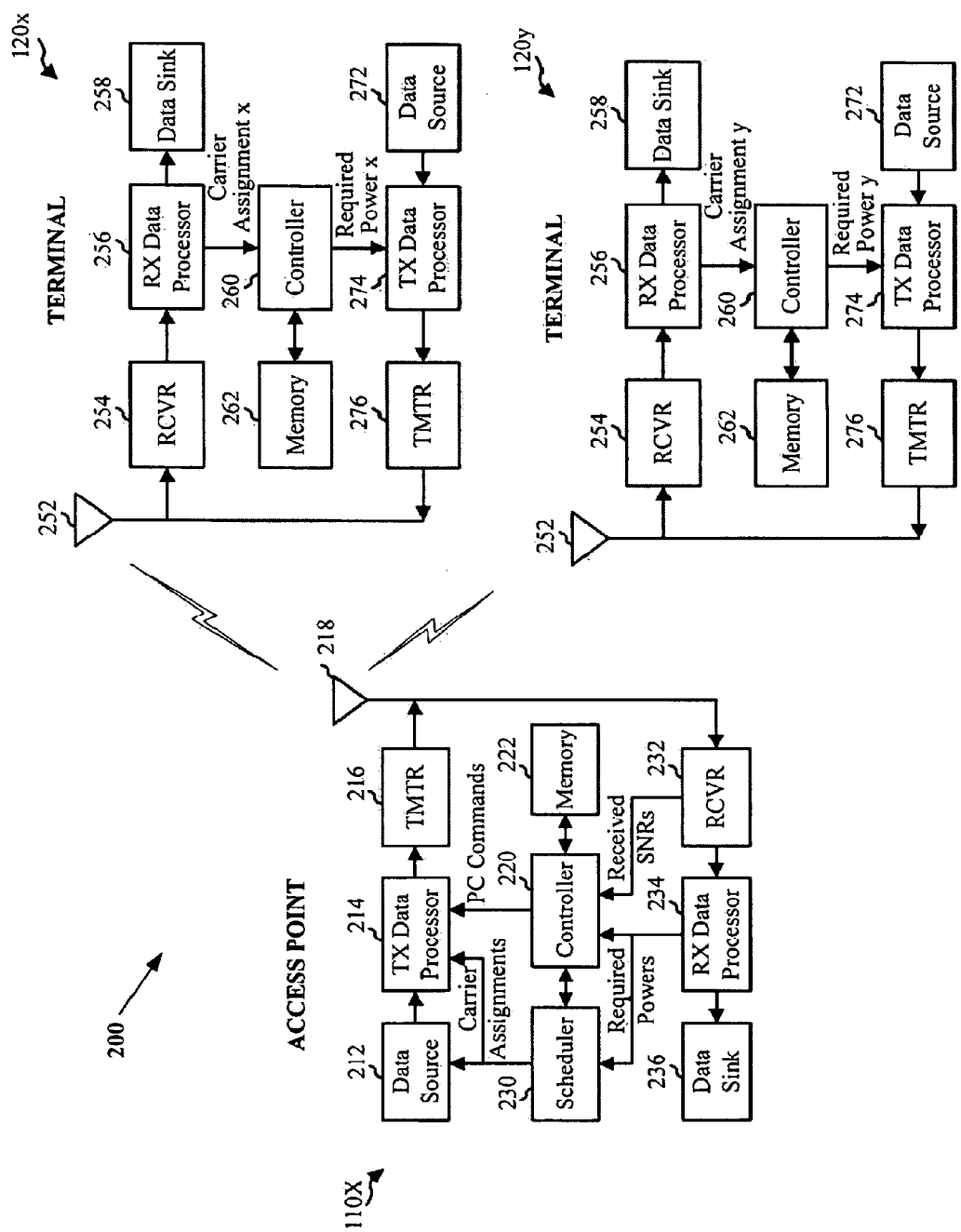
FIG. 2 shows a block diagram of an embodiment of an AP and two ATs in multiple-access multi-carrier communication system.

FIG. 2 illustrates a block diagram 200 of an embodiment of an AP 110x and two ATs 120x and 120y in multiple-access multi-carrier communication system 100. At AP 110x, a transmit (TX) data processor 214 receives traffic data (e.g., information bits) from a data source 212 and signaling and other information from a controller 220 and a scheduler 230. For example, controller 220 may provide power control (PC) commands that are used to adjust transmit power of active ATs, and scheduler 230 may provide assignments of carriers for the ATs. These various types of data may be sent on different transport channels. TX data processor 214 encodes and modulates the received data using multi-carrier modulation (e.g., OFDM) to provide modulated data (e.g., OFDM symbols). A transmitter unit (TMTR) 216 then processes the modulated data to generate a downlink modulated signal that is then transmitted from an antenna 218. Additionally, memory 222 can maintain information regarding current or previous assignments and/or power levels.

At each of ATs 120x and 120y, the transmitted and modulated signal is received by an antenna 252 and provided to a receiver unit (RCVR) 254. Receiver unit 254 processes and digitizes the received signal to provide samples. A received (RX) data processor 256 then demodulates and decodes the samples to provide decoded data, which may include recovered traffic data, messages, signaling, and so on. The traffic data may be provided to a data sink 258, and the carrier assignment and PC commands sent for the terminal are provided to a controller 260. Memory 262 can be used to store the received maps and other information facilitating operation of the terminal. Controller 260 directs data transmission on the uplink using resources that have been assigned to the terminal and indicated in the received assignment.

Controller 220 directs data transmission on the downlink using resources that have been assigned to the terminal. Controller 220 further injects erasure signature packets when there is no actual data to transmit, yet desires to keep the assigned resources.

For each active terminal 120, a TX data processor 274 receives traffic data from a data source 272 and signaling and other information from controller 260. For example, controller 260 may provide information indicative of channel quality information, required transmit power, the maximum transmit power, or the difference between the maximum and required transmit powers for the terminal. The various types of data are coded and modulated by TX data processor 274 using the assigned carriers and further processed by a transmitter unit 276 to generate an uplink modulated signal that is then transmitted from antenna 252.

At AP 110x, the transmitted and modulated signals from the ATs are received by antenna 218, processed by a receiver unit 232, and demodulated and decoded by an RX data processor 234. The decoded signals can be provided to a data sink 236. Receiver unit 232 may estimate the received signal quality (e.g., the received signal-to-noise ratio (SNR)) for each terminal and provide this information to controller 220. Controller 220 may then derive the PC commands for each terminal such that the received signal quality for the terminal is maintained within an acceptable range. RX data processor 234 provides the recovered feedback information (e.g., the required transmit power) for each terminal to controller 220 and scheduler 230.

Scheduler 230 may provide an indication to controller 220 to maintain the resources. This indication is provided if more data is scheduled to be transmitted. For the AT 120x, the controller 260 may determine if resources are required to be maintained. In certain aspects, controller 220 may perform instructions that provide the functionality of scheduler 230.

Figure 3:
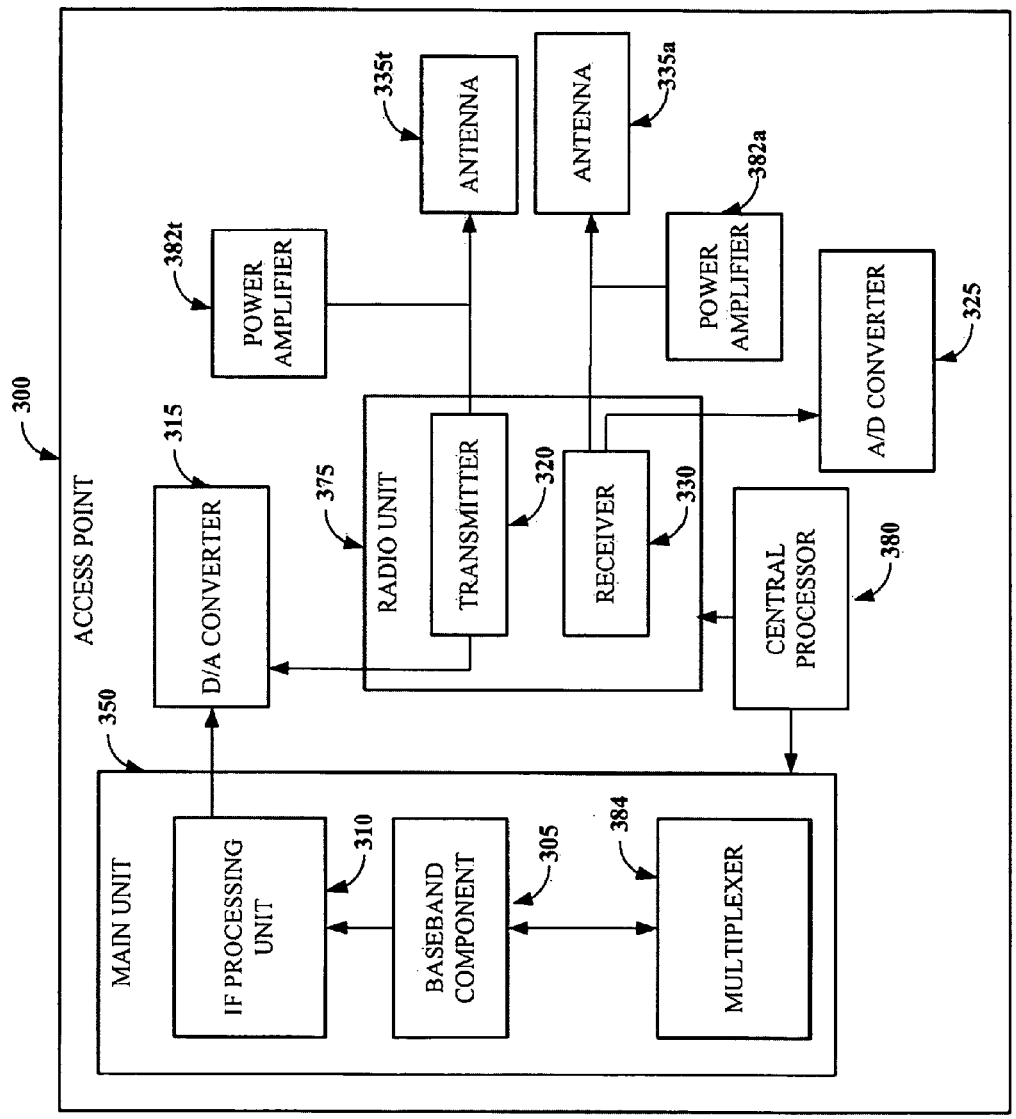
FIG. 3 shows a schematic diagram of an AP in accordance with an aspect.

As depicted in FIG. 3, an access point 300 can include a main unit (MU) 350 and a radio unit (RU) 375. MU 350 includes digital baseband components of an access point— for example, MU 350 can include a baseband component 235 and a digital intermediate frequency (IF) processing unit 310. Digital IF processing unit 310 digitally processes radio channel data at an intermediate frequency by performing functions such as for example filtering, channelizing, modulation, and so forth. RU 375 includes analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 375 can include one or more receivers 330 connected to one more antennas 335a-t for receiving radio communications from mobile subscriber units. In an aspect, one or more power amplifiers 382 a-t are coupled to one or more antennas 335 a-t.

Connected to receiver 330 is an analog-to-digital (A/D) converter 325. A/D converter 325 converts the analog radio communications received by receiver 330 into digital input for transmission to baseband component 305 via digital IF processing unit 310. RU 375 can also include one or more transmitters 320 connected to either the same or different antenna 335 for transmitting radio communications to access terminals. Connected to transmitter 320 is a digital-to-analog (D/A) converter 315. D/A converter 315 converts the digital communications received from baseband component 305 via digital IF processing unit 310 into analog output for transmission to the mobile subscriber units. In some embodiments, a multiplexer 384 for multiplexing of multiple-channel signals and multiplexing of a variety of signals including a voice signal and a data signal. A central processor 380 is coupled to main unit 350 and Radio Unit 375 for controlling various processing which includes the processing of voice or data signal.

One or more aspects of a wireless communication system design are described that support full & half duplex FDD (Frequency Division Duplex) and TDD (Time Division Duplex) modes of operation, with support for scalable bandwidth. However, this need not be the case, and other modes may also be supported, in addition to, or in lieu, of the previous modes. Further, it should be noted that the concepts and approaches herein, need not be used in conjunction with any other of the concepts or approaches described herein.

As detailed supra, all access terminals within a cell may not receive assignment information from a serving base station due to a various reasons. Consequently, they would not be able to fully utilize resources assigned to them. Various methodologies and systems described herein aim at improving reception of resource assignment messages within a cell so that all or substantially all access terminals are able to receive them, thereby leading to optimal utilization of system resources. For example, users can be grouped into N number of groups ($N \geq 1$), according to respective SNR conditions. A group can be assigned to a particular fixed set of traffic resources, e.g., a traffic channel interlace, in which case the corresponding resource assignment message for that group does not have to include the description of the fixed interlace. Alternatively, a group may be assigned to correspond to a different set of traffic resources, e.g., a different traffic channel interlace from one time to another, depending on the decision by a resource management scheduler, in which case the corresponding resource assignment message for that group needs to include the description of the fixed interlace. Particular users in a group assigned to use a traffic resource can be determined by an FL broadcast control method, which is a bit mask. Size of the bitmap control message can be different for respective interlaces (e.g., the one corresponding to lower SNR has smaller bit mask size or is transmitted with a channel coding and modulation scheme of lower spectral efficiency in order to successfully deliver the bitmap control message to the access terminals of lower SNR).

More particularly, power requirements vary as a function of AT location within a cell as well as SNR, and other factors. Moreover, size of bit masks impacts resource utilization as well. Conventional systems typically assign bit masks as a function of worst case scenarios in order to mitigate loss of assignment information to ATs. However, applicants have determined that there are unexpected benefits associated with initially increasing processing overhead by generating multiple sets of bit masks (e.g., different sizes), and assigning respective bit masks to groups of ATs as a function of attributes of the ATs. For example, ATs at fringes of a cell, or having bad SNR can be assigned large bit masks (e.g., high level of information) while ATs closer to an AP, having better SNR, can be assigned relatively smaller sized bit masks. Likewise, transmission power as well as channel coding and modulation scheme associated with the bit masks can also vary as a function of respective AT attributes. Accordingly N number of AT groups can be formed and each group associated with a particular bit mask type, or transmission power. As a result, a load balancing of resources is achieved as a function of respective AT attributes. The cost of generating separate sets of bit masks is unexpectedly outweighed by the overall benefits achieved through system resource optimization. In one embodiment, the groups of different bit masks are fixed such that the number of bit mask groups is fixed, and/or the size of each bit mask group is fixed. Moreover, the channel coding and modulation scheme and/or the transmission power of each bit mask group are fixed. In another embodiment, the groups of different bit masks vary as access terminals come and go and their attributes change.

Figure 4A:
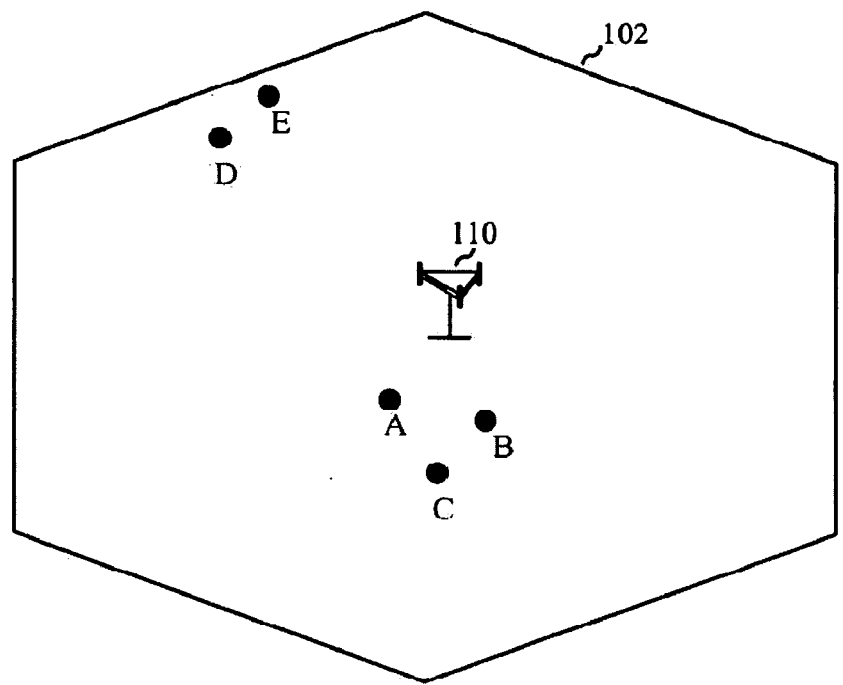
FIG. 4A shows a diagram of cell with an AP servicing multiple users in accordance with an aspect.

FIG. 4A illustrates a more detailed figure of cell 102. Within the cell, a serving base station or access point 110 controls access to system resources to facilitate smooth communication for various users/ATs A, B, C, D and E. The resources can include bandwidth allocations for control and data signaling on common/dedicated channels for transmitting/receiving data. For example, within a CDMA communication system, an AT that transmits a data signal is assigned a CDMA control channel and one or more CDMA traffic channels for data transmission. The AP conveys such assignments by broadcasting a message comprising a bit mask to users A, B, C, D and E within the cell. For example, this message may be conveyed to the terminals through a forward paging channel. The associated ATs upon receiving the bit mask, decode it in order to determine or infer which, if any, of the resources have been assigned to them.

Figure 4B:
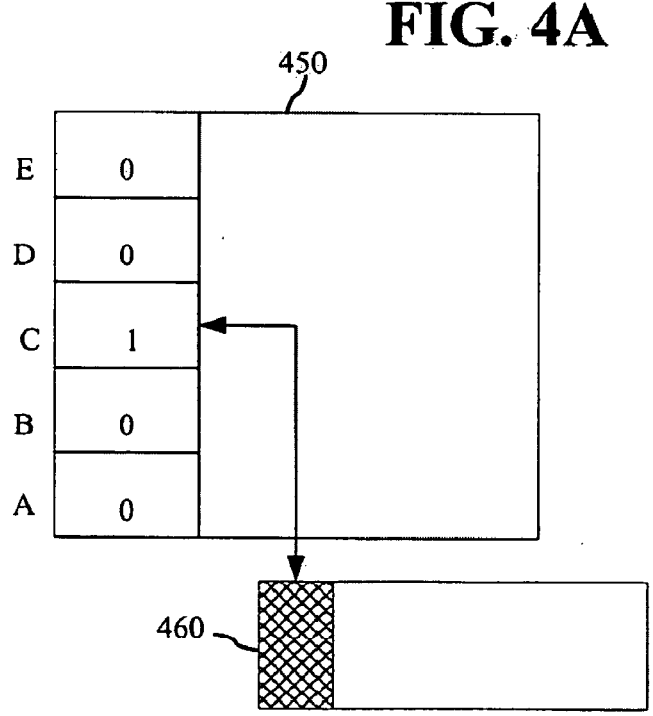
FIG. 4B illustrates a schematic diagram of a bit mask transmitted to users within a cell.

FIG. 4B illustrates a schematic diagram of a bit mask 450 that is transmitted to access terminals in order to inform them about resource assignments. As seen in the figure, each access terminal within the cell is represented by a bit, and the information regarding which of the resources, if any, have been assigned can be conveyed through the bit values. For example, in this case, the value of bits associated with terminals A, B, D and E are '0' whereas the value of the bit associated with terminal C is '1'. Accordingly, the terminals can decode that a downlink traffic resource 460 is assigned only to terminal C.

However, as mentioned supra, all terminals may not receive the bit mask due to various factors like power constraints, presence of obstacles etc. For example, as seen in FIG. 4A, all terminals are not equidistant from the AP 110. Terminals A, B and C are located closer to the AP in comparison to terminals D and E which are located farther away and closer to an edge of cell 102. Hence, it is likely that while terminals A, B and C receive the bit mask 450 transmitted by the AP 110, one or more of D or E may not receive the bit mask. If downlink traffic resource 460 were assigned to either of these terminals, it could result in an error and the assignment being lost.

A technique to mitigate such loss of information is transmitting a message comprising the bit mask assuming a worst case scenario. Accordingly, the bit mask is transmitted with maximum power to all terminals so that those terminals like D and E located on fringes of the cell also obtain clear reception of the bit mask. However, this may not be an optimal solution since terminals such as A, B, and C do not require a resource assignment message to be transmitted with high power as they are closer to the access point. Additionally, as seen in FIG. 4B, the bit mask comprises bits corresponding to resource assignment to all terminals within the cell. Although for illustration purposes only five ATs are shown in FIG. 4A, it is to be appreciated that the AP 110 can service numerous ATs within the cell 102. Accordingly, if a bit mask comprising a large number of bits corresponding to all ATs is transmitted to all users within a cell it would likely result in a large resource assignment message which could require more resources (e.g., more power or larger bandwidth resource such as lower channel coding or modulation rate, for transmission). By selectively grouping ATs as a function of attributes (e.g., SNR, distance from AP, interference . . . ), and adjusting size of bit masks employed for respective groups overall system resource optimization is facilitated.

Figure 4C:
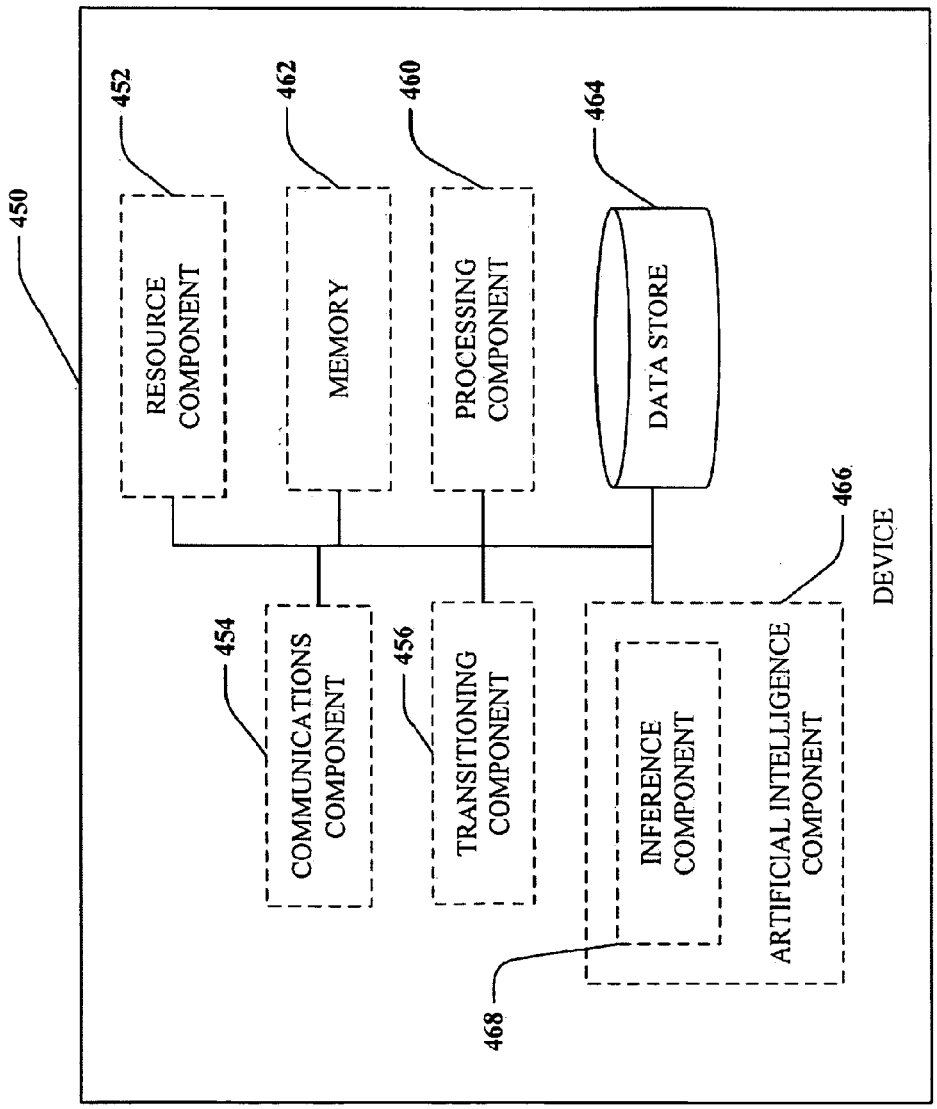
FIG. 4C illustrates a schematic diagram of a device in accordance with aspects described herein.

FIG. 4C illustrates a high-level system diagram of various components in accordance with one particular aspect of a device 450 in accordance with various aspects. It is to be appreciated that the device 450 may be an AP, an AT, or a combination thereof. A resource component 452 identifies available resources in connection with current and expected location and state of an AT or user thereof, and assignments of such resources. Since all access terminals within a cell may not receive assignment information from a serving base station, they may not be able to fully utilize resources assigned to them. The resource component 452 facilitates improving reception of resource assignment messages within a cell so that all or substantially all access terminals are able to receive them, thereby leading to optimal utilization of system resources.

As can be appreciated, there are a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.11 wireless LAN or Blue Tooth techniques. Such systems may provide services at different geographical areas. Therefore, it is desired that device 450 be capable of obtaining service from multiple systems.

In some cases, several different systems may provide services in geographically overlapping areas. Moreover, service quality may be different for a different system. For example, for a given device, signal quality of one system may be better than that of another system, and service charge of one system may be lower than that of another system. A device capable of employing multiple systems can select a best system to receive service at a given time. Resource sensing component 452 can monitor for available resources as well as resources soon to be available (as well as soon to be no longer available) in connection with receiving services and utilization of other resources (e.g., devices, software, functionalities, etc.).

Device 450 can optionally be capable of obtaining communication services from one or more available systems. For example, device 450 may work in an OFDMA FDD system as well as in an ad hoc network system. Device 450 can include one of a plurality of RF transceiver processing chains, and common digital signal processing hardware. The common digital signal processing hardware can be loaded with different software images, one corresponding to an OFDMA FDD system and another corresponding to an ad hoc system. Device 450 may also include other hardware, e.g., ASIC, components, which are used exclusively by one of the two systems. In at least one of the systems of which the device 450 is capable, a beacon signal can be sent by an access point to facilitate system identification, acquisition, synchronization to assist device 450 in checking availability of the spectrum. The access point in the system is typically a gateway through which device 450 can access a large network, e.g., the Internet. The access point can also be a standalone device, transmitting certain pre-defined signals to help the device 450 utilize spectrum in the area.

A beacon signal includes a sequence of beacon signal bursts in a spectrum band. A beacon signal burst includes one or more (a small number) beacon symbols. In an exemplary orthogonal frequency division multiplexing (OFDM) system, a beacon symbol is a single tone over an OFDM symbol period. A beacon signal burst can include a small number of beacon symbols of a single tone over a small number of transmission symbol periods, e.g., one or two symbol periods. The beacon signal bursts are transmitted in an intermittent (non-continuous) manner so that there are a number of symbol periods between first and second beacon signal bursts. Successive beacon signal bursts may use different tones according to a predetermined or pseudo random tone hopping sequence, for example. In another aspect, a beacon symbol can be an impulse signal. Device 450 can detect the beacon signal with little complexity. In an OFDM system, device 450 can perform a fast Fourier transform (FFT) operation on the received signal to transform the signal to frequency domain.

Resource component 452 can detect a beacon signal if one of the FFT output elements carries significantly higher energy than average. In an impulse signal case, resource sensing component 452 can check time domain samples of a received signal, and detect a beacon signal if one of the samples carriers has significantly higher energy than average.

In one particular aspect, an access point can send a beacon signal according to a pre-defined schedule. The access point may also transmit other data/control signals, called regular signals. The beacon signal can be overlaid to the regular signals. In some cases, the access point may only send the beacon signal. It is possible that the beacon signals may be transmitted in all systems of which device 450 is capable. It is also possible that the beacon signals are transmitted in only a subset of systems of which device 450 is capable.

If resource component 452 finds only one particular system is available to use, device 450 will proceed to employ that system. If resource component 202 finds multiple systems are available, device 450 can select one or more of them according to a selection criterion, or policies, such as signal quality or service charge. It is to be appreciated that in various aspects device 450 can be concurrently engaged with services and resources associated with more than one system.

Resource component 452 can identify attributes associated with respective ATs, and selectively group ATs as a function of commonality of attributes and associate unique bit masks with respective groups in order to mitigate waste of system resources (e.g., sending heavy bit masks at high power to ATs that only smaller bit masks at significantly lower power).

A communications component 454 provides for establishing and maintaining communications with one or more parties utilizing hardware, software, and services as described herein. Transitioning component 456 provides for transitioning a communication session from one set of resources to another. Transitioning component can utilize other components and resources (e.g., memory, buffers, etc.) to facilitate seamless transitioning of the session. It will be appreciated that a session can be overlapped between sets of resources to provide for redundancy to mitigate loss of the session. For example, multiple devices, protocols, services etc. can be utilized concurrently to ensure that the session is seamlessly transitioned from one set of resources to another set of resources. Accordingly, transitioning component 456 can provide for multiple devices and resources to coordinate until particular devices and other resources are deemed to be used for a pre-determined time prior to another communication session transition being initiated.

A particular example of how transitioning component 456 can provide for such session transitioning is if it is determined that a cellular telephone using a licensed band is intended to be transitioned to a home speaker system using an unlicensed band. As the transitioning is initiating, transitioning component 456 can pre-fetch and activate new resources (e.g., home speaker system, and resources associated with the unlicensed band), so that they are concurrently activated with present resources associated with the current session. More particularly, for example, the session maybe conducted across both sets of resources (current and intended new set) until it is deemed the entire set of new resources are being used and the previous set is no longer necessary—at such point in time, transitioning component 456 can drop the previous set of resources. It is to be appreciated that various filters, and functionalities can be employed to mitigate effects of noise, cross-talk, feedback, etc. that might result as an undesired bi-product of concurrently employing multiple sets of resources in connection with a communications session. Moreover suitable hand-off policies, software layers, protocols, hardware and software can be employed in connection with resource transitioning as described herein.

An alternative aspect of transitioning component 456 can include an option that allows the user to make a hard transition to the new set of resources. Transitioning component 456 can likewise provide a notice to the user and the target recipient that the session is being transferred to a new set of resources. Transitioning component 456 can in one aspect perform such transitioning automatically, and in alternative aspects provide options and notifications so that the user can effect transitioning manually or semi-automatically.

Transitioning component 456 can coordinate with resource component 452 in connection with selecting or generating appropriate bit masks for respective groups as well as modifying bit masks.

Processing component 460 carries out processing functions associated with one or more of components and functions described herein. Processing component can include a single or multiple set of processors or multi-core processors. Moreover, processing component 460 can be implemented as an integrated processing system and/or a distributed processing system. Memory 462 can include random access memory (RAM), read only memory (ROM), and a combination thereof. Data store 464 can be any suitable combination of hardware and/or software that provides for mass storage of information, databases, and programs employed in connection with aspects described herein.

Device 450 can optionally include an artificial intelligence component employing principles of artificial intelligence (AI) 466 to facilitate automatically performing various aspects (e.g., transitioning communications resources, analyzing resources, extrinsic information, user/AT state, and preferences, risk assessment) as described herein. AI component 466 can optionally include an inference component 468 that can further enhance automated aspects of the AI component utilizing in part inference based schemes to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

It is to be appreciated that in aspects where device 450 is an AT, the resource component 452 can send SNR information to an AP for appropriate AT grouping and bit mask assignment. In addition, in another embodiment the device 450 can recommend changing to another AT group as a function of change in its state (e.g., SNR level has changed, location thereof has changed . . . ).

Figure 4D:
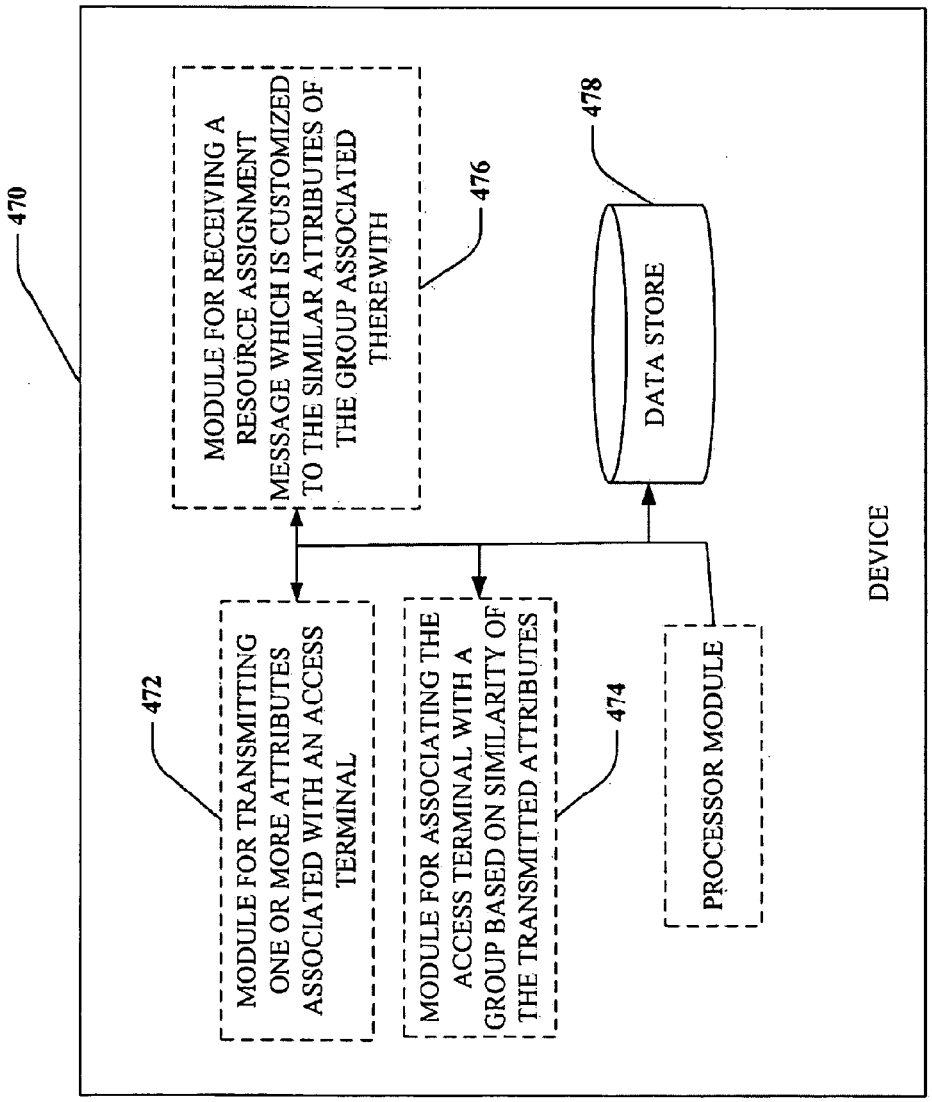
FIG. 4D illustrates a schematic diagram of a device in accordance with aspects described herein.

FIG. 4D illustrates an embodiment of a device 470 that includes a module 472 for transmitting one or more attributes associated with an access terminal. Module 474 associates the access terminal with a group based on similarity of the transmitted attributes. Module 476 receives a resource assignment message which is customized to the similar attributes of the group associated therewith.

FIG. 5A relates to a communication system that employs a method of broadcasting resource assignments in accordance with another aspect. It illustrates a detailed figure of the cell 102 with the serving base station/access point 110 and access terminals A, B, C, D and E. The terminals A, B, and C are located closer to the access point while terminals D, E are located farther away from the AP, closer to the edge of the cell. As mentioned supra, AP 110 provides resources for communication to these various ATs and communicates such assignments to them through one or more bit masks. In accordance with an aspect, the ATs can communicate their attributes, for example SNR (signal to noise ration), to the AP. These attributes are employed by the AP to determine if the ATs can be grouped together in order to transmit a common bit mask assigning resources to them. The AP can obtain these attributes through various modes. For example, an initial access probe transmitted by an accessing mobile terminal via a reverse access channel (R-ACH) can be used by the AP to derive SNR associated with that particular access terminal. The AP 110 can thus determine that terminals A, B and C share similar attributes, for example a higher SNR, while terminals D and E may comparatively have lower SNR. For example, the difference in SNR values of A, B, and C can be less than or equal to 6 dB. Accordingly, AP 110 groups all terminals according to their shared attributes. Accordingly, terminals A, B, C are grouped together as Group I whereas D and E together form Group II. In accordance with an aspect, the difference in average SNR values associated with terminals within different groups can be equal to or greater than 3 dB. The AP 110 now transmits two bit masks, one on each interlace. Hence, each group receives a bit mask which carries information regarding assignment of resources to all access terminals comprised therein.

FIG. 5B illustrates a schematic diagram of bit masks 510 and 520 that can be transmitted to Group I and Group II respectively in order to inform them about resource assignments. As shown, each access terminal within a group is represented by a bit in respective bit masks and the information regarding which of the resources if any, have been assigned can be conveyed through the bit values. Accordingly, as signaled by bit value '1' associated with the terminal C, it can be inferred by the terminals A, B and C that traffic resources 460 are entirely assigned to terminal C.

FIG. 5C is another schematic diagram of bit mask 530 that can be transmitted by AP 110 to Group I in accordance with another aspect. As shown, the bits associated with terminals B and C are set to '1' indicating that downlink traffic resource 460 is shared by these terminals. In different aspects, the bit masks associated with different groups are configured based on the received attributes of the ATs comprised within respective groups. For example, there are three terminals within Group I and they are all associated with high SNR. Hence, a bit mask associated with this group is configured to comprise 3 bits, one for each of the terminals, while bit mask 520 is tailored to group II and hence is configured with two bits. Additionally, the bit mask associated with Group I is transmitted with lower power as compared to bit mask which is broadcast to group II. This is due to the fact that group I has terminals with higher SNR as compared to group II and is better able to receive low power transmissions. Therefore, it would not need the bit mask to be transmitted at the same power as group II. By dividing users within the cell into two groups, the AP 110 is able to optimize resources as it customizes the bit masks based on the attributes of the ATs within the groups. Additionally, in accordance with aspects discussed herein, bit mask 530 comprising larger number of bits is transmitted lower power as compared with bit mask 520. It should be understood that the example discussed herein is by way of illustration and not limitation. In contrast, if number of ATs closer to the edge of the cell is larger as compared to the vicinity of the AP, it would follow that the bit mask transmitted to a group comprising the far away ATs would comprise higher number of bits. In one embodiment, a fixed number of access terminals can be associated with each group that receives a bit mask. Hence, a threshold value can be associated with a group size and if the number of access terminals exceeds the threshold, a new group can be formed even though the access terminals may all share similar values for observed attributes. In other embodiments, the number of access terminals in a group may vary as further detailed infra.

Figure 6A:
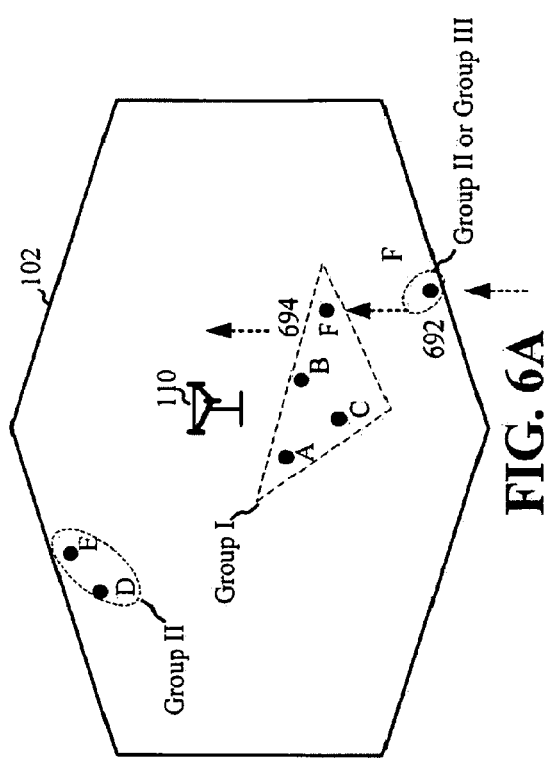
FIG. 6A shows a diagram of a cell with an AP servicing multiple users by dynamically grouping them based on their respective attributes according to yet another aspect.

FIG. 6A is a diagram of a communication system that groups terminals to transmit resource assignment messages in accordance with another aspect. It is a detailed diagram of cell 102 being serviced by AP 110. Terminals A, B, C are closer to the AP and hence form group I that receives a resource assignment message transmitted as a bit mask 510. Terminals D, E are far away from the AP 110 closer to an edge of the cell. They form group II that receives resource assignment message in the form of a bit mask 520. A new user with an access terminal F enters the cell 102 and may conduct a handoff. Initially, the terminal F is on the edge of the cell, e.g., at position 692. In accordance with various aspects, the handoff may be a soft or a hard handoff. As detailed supra, when the AP 110 receives a request for resources from terminal F, it can employ the received signal to determine attributes of the terminal such as SNR. The SNR of terminal F can be compared to the SNRs of already existing groups I and II in order to determine if terminal F can belong to either of these groups and accordingly terminal F is either included into an appropriate group or a new group is created dynamically as further detailed infra.

Figure 6B:
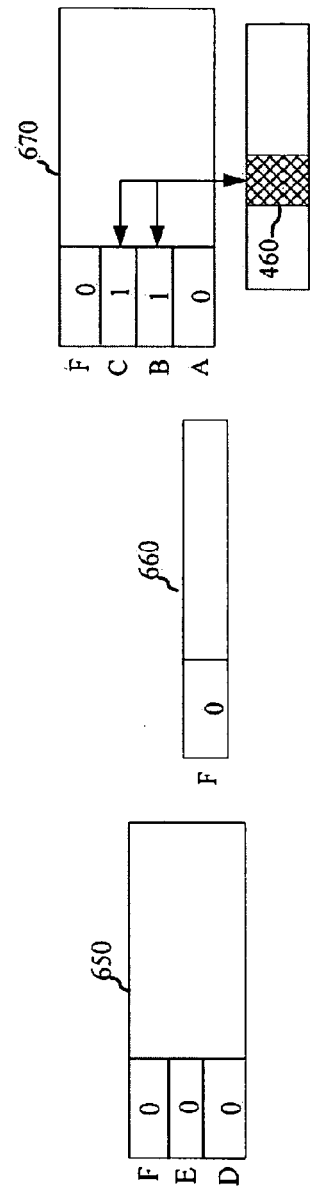
FIG. 6B is a schematic diagram of bit masks transmitted to different groups dynamically based on inclusion or exclusion of users/access terminals from within the group.

FIG. 6B is a schematic diagram of bit masks that are transmitted to different groups in order to accommodate new terminals as they enter or leave cell 102. As stated supra, if the SNR of terminal F is similar to the SNR of one of the existing groups it can be included into such a group. For example, if SNR of terminal F is similar to SNR values of terminals in group II, terminal F is associated with this group and accordingly a bit mask 650 with appropriate attributes is transmitted to terminals within group II. If the SNR of terminal F is not similar to any of the existing groups, the AP 110 determines that a new group III comprising at least terminal F should be formed. Accordingly, a bit mask 660 comprising one bit is transmitted to the terminal F to indicate assignment of resources.

In accordance with further aspects, if terminal F is continuously moving towards the AP 110, it is likely that the SNR of terminal F is changing continuously and after traversing a certain distance at position 694 its SNR can be similar to the SNR of group I. For example, the difference in SNRs of the terminal F and group I may be less than 6 dB. At that point, AP 110 determines that terminal F can be grouped along with terminals A, B and C into group I. Accordingly, it either dissolves group III or removes terminal F from group II and includes terminal F into existing group I. A new bit mask 670 can now be transmitted to all the terminals to indicate corresponding assignment of resources. In accordance with different aspects, the new bit mask 670 can comprise new bit values for the terminals to indicate any changes in resource assignments. If the terminal F continues to move, its SNR may change accordingly and thereby new groups may have to be formed. This procedure need not be limited to new access terminals entering the cell. It should be understood that AP 110 can continuously monitor the attributes of all the access terminals in cell 102 to dynamically form/dissolve groups in order to not only ensure that all terminals receive resource assignment messages but also to conserve resources. In accordance with different aspects, the AP 110 also determines group sizes based on SNRs of the requesting terminals. For example, it can be preferable to form smaller groups for terminals having lower SNRs whereas larger groups can be formed for terminals with higher SNRs.

In view of exemplary aspects described herein, methodologies that can be implemented in accordance with the disclosed subject matter are discussed. While, for purposes of simplicity, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement respective methodologies. It is to be appreciated that the functionality associated with various blocks may be implemented by software, hardware, a combination thereof or any other suitable means (e.g., device, system, process, component). Additionally, it should be further appreciated that some methodologies disclosed hereinafter and throughout this specification are capable of being stored on an article of manufacture to facilitate transporting and transferring such methodologies to various devices. Those skilled in the art will appreciate and understand that a methodology can alternatively be represented as a series of interrelated states or events such as for example in a state diagram.

Figure 7:
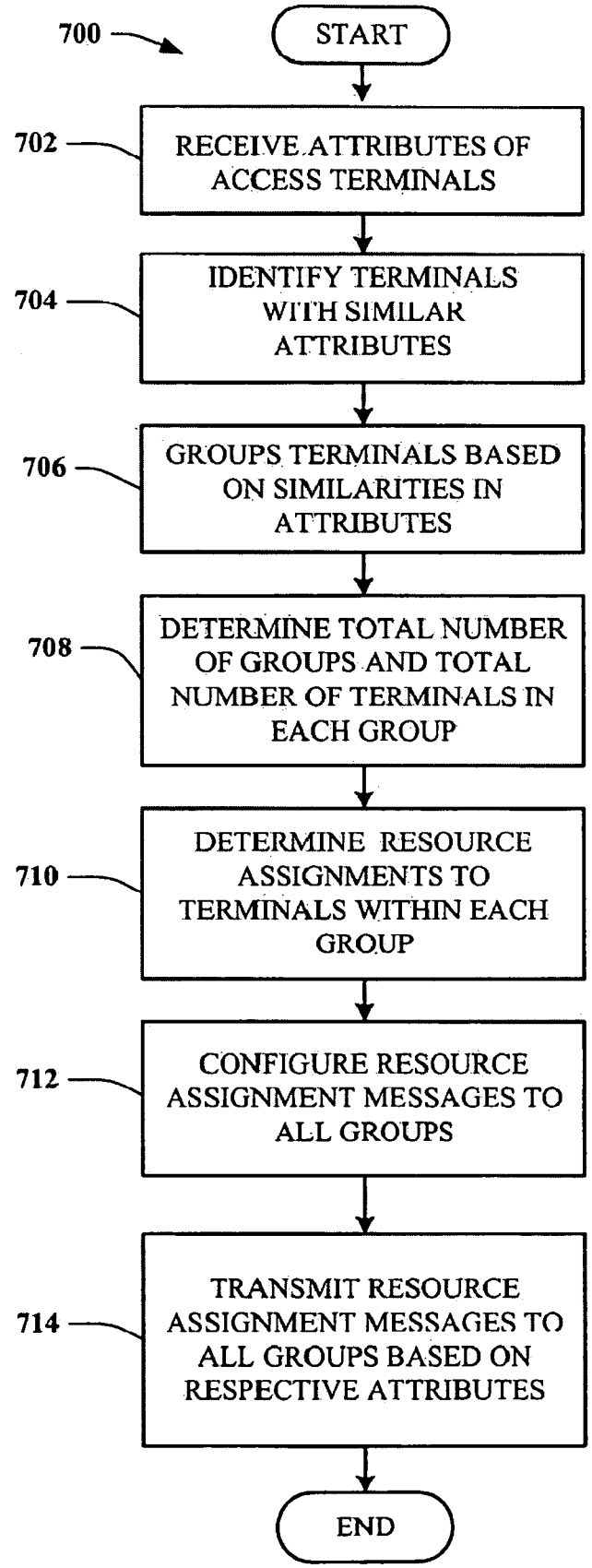
FIG. 7 is a flow chart detailing a method of communicating assignment of resources to different users by grouping them based on various attributes of their associated ATs.

FIG. 7 is a flow chart 700 detailing a method of transmitting resource assignment messages in accordance with an aspect. Initially at 702, an AP receives various attributes such as SNR of access terminals within its cell. The attributes of terminals can be derived via different methods such as access requests transmitted by the terminals for resources. At 704, terminals with similar SNR conditions are identified. Subsequently at 706, those terminals with similar SNR conditions are grouped together. As detailed supra, sizes of groups can be determined based on received attributes of various access terminals. Accordingly, the number of groups and number of terminals in each group are determined at 708. At 710, resources to be assigned to various terminals within each group are determined. At 712, resource assignment messages are configured based on number of groups, number of terminals in each group as well as specific resources assigned to each terminal within different groups. According to an aspect, the number of resource assignment messages configured at 712 can be equal to the number of groups. In accordance with yet another aspect, the resource assignment message can be a bit mask such that, each group receives a single bit mask comprising as many number of bits as the number of terminals within the group. As stated supra, the number of access terminals associated with a group can be fixed or may vary in accordance with different aspects. Further, the bit values within a bit mask transmitted to a group can indicate to the terminals which if any resources have been assigned to them. At 714, the messages are transmitted to various groups based on their SNR conditions. Each group corresponds to one interlace of traffic resource. As stated supra, groups closer to the AP can have higher SNR values and thereby their bit masks may be transmitted with lower power whereas groups having lower SNR values will require bit masks to be transmitted with higher power. Thus, the AP can customize the resource assignment messages to various terminals within a cell to suit their attributes thereby optimizing transmissions while at the same time, conserving resources.

Figure 8:
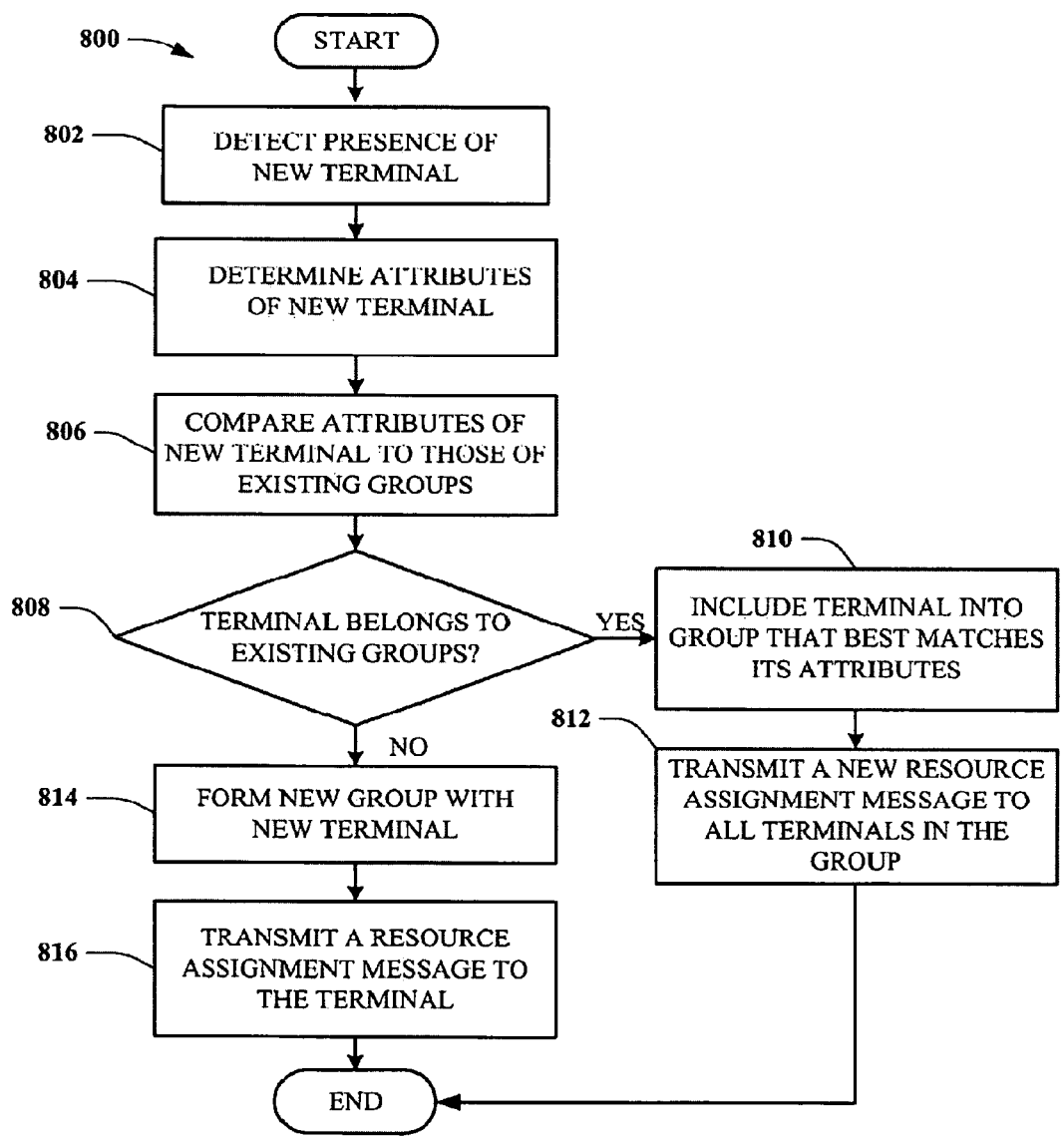
FIG. 8 is a flow chart that shows a method of conveying information regarding assignment of resources to new users within a cell.

FIG. 8 is another flow chart 800 illustrating a method of transmitting resource assignment messages in accordance with an aspect. The method starts at 802 wherein an AP detects presence of a new terminal within its cell. An AP can detect an AT via different mechanisms for example, when the terminal request access via initial transmissions on R-ACH. At 804, the AP employs the transmissions received from the new terminal to determine its attributes. In accordance with an aspect, the AP determines SNR of the new terminal. At 806, the attributes of the new terminal are compared with attributes of terminals within existing groups. At 808, the AP determines if the attributes of the new terminal are similar to attributes of terminals within any of the existing groups. If yes, at 810 one of the existing groups whose attributes best match the terminal's attributes is identified and the new terminal is included into it. Subsequently, the AP transmits a new resource assignment message such as a bit mask to all the terminals within the group at 812 and the process concludes at the stop block. If the attributes of the terminal do not match with any of the existing groups, a new group comprising at least the new terminal is formed at 814. At 816, the AP transmits a resource assignment message for example, a bit mask comprising a single bit based on the received SNR conditions of the new terminal and the process reaches the stop block.

Figure 9:
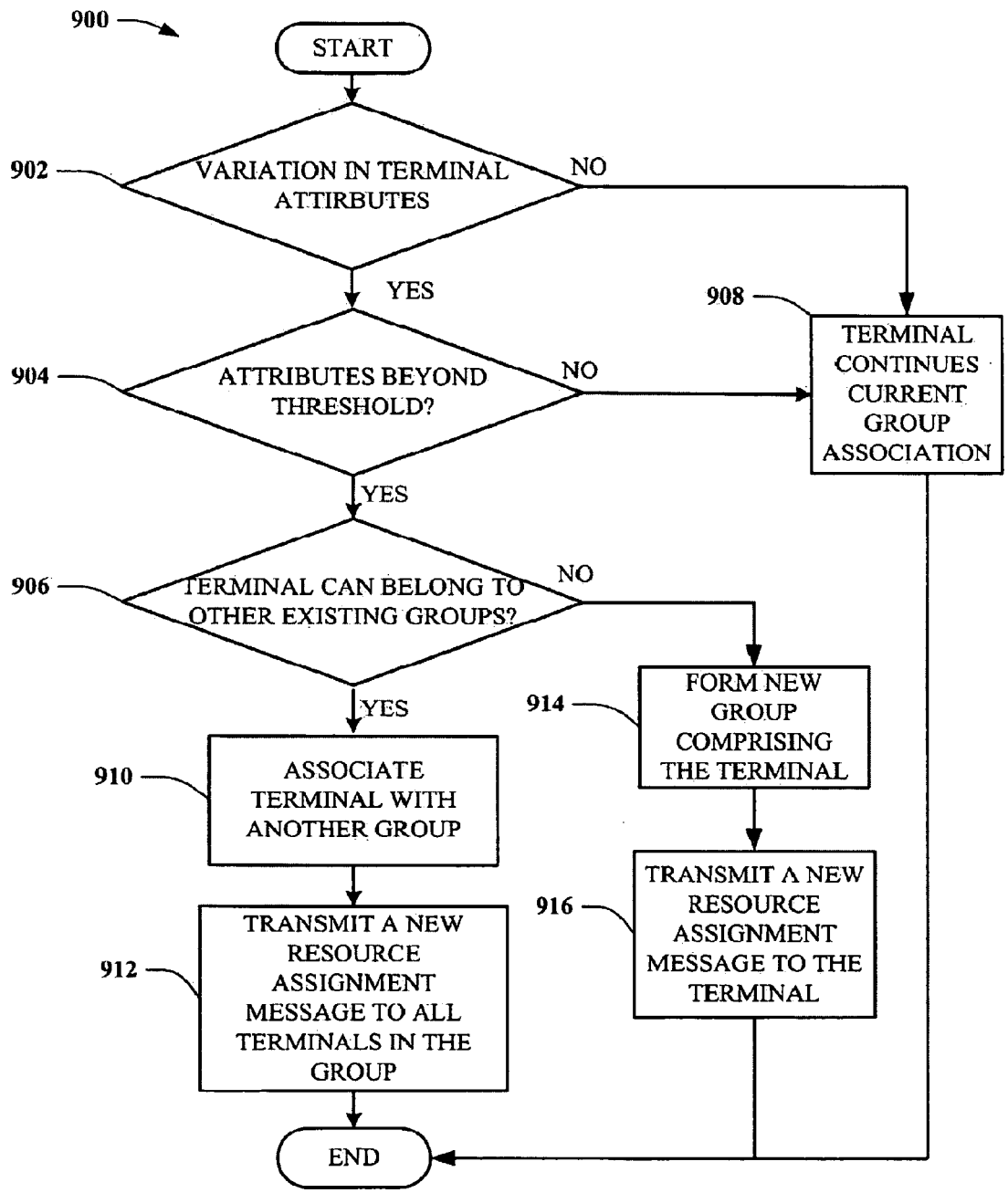
FIG. 9 illustrates a flow chart the details a method of dynamically forming new groups within a cell in order to transmit resource assignment messages in accordance with an aspect.

FIG. 9 illustrates a flow chart the details a method of dynamically forming new groups within a cell in order to transmit resource assignment messages in accordance with an aspect. Initially at 902, a serving base station or access point determines if attributes of a terminal belonging to a group are varying. For example, if a terminal is in motion, the attributes such as SNR conditions of the terminal can vary. If the attributes of the terminal are constant, the terminal continues to be associated with the current group as indicated at 908 and the process reaches the stop block. If the attributes of the terminal are varying, at 904 such attributes, for example, its SNR conditions are compared to a predetermined threshold associated with the group to which the terminal currently belongs. For example, a terminal may be initially included in a group associated with poor SNR conditions. However, due to changes in its state, for example, its motion that brings it closer to the base station, the SNR conditions of the terminal improve beyond a threshold associated with the group. Converse may be true if the terminal initially belongs to a group closer to the serving base station and subsequently moves away from it. If the attributes of the terminal are still within the threshold the terminal continues to be associated with current group as indicated at 908. However, if the attributes of the terminal vary beyond thresholds associated with various attributes for a group, a determination is made at 906 to verify if the terminal can be associated with other groups currently existing within the cell. If yes, the group that best matches the attributes of the terminal is determined and the terminal is included into it at 910. Accordingly, a new bit mask is transmitted to all the terminals within the group at 912. If attributes of the terminal do not match those of any existing groups, a new group comprising at least the terminal is formed at 914. A resource assignment message such as a bit mask comprising a bit and customized to particular SNR conditions of the terminal is transmitted at 916. Although, for clarity the procedure has been described with respect to a single terminal, it should be understood that within a given cell there can be a plurality of terminals belonging to different groups that may be continuously in motion. Accordingly, the system simultaneously tracks their attributes and dynamically reassigns and/or forms new groups based on variations of their respective attributes.

Figure 10:
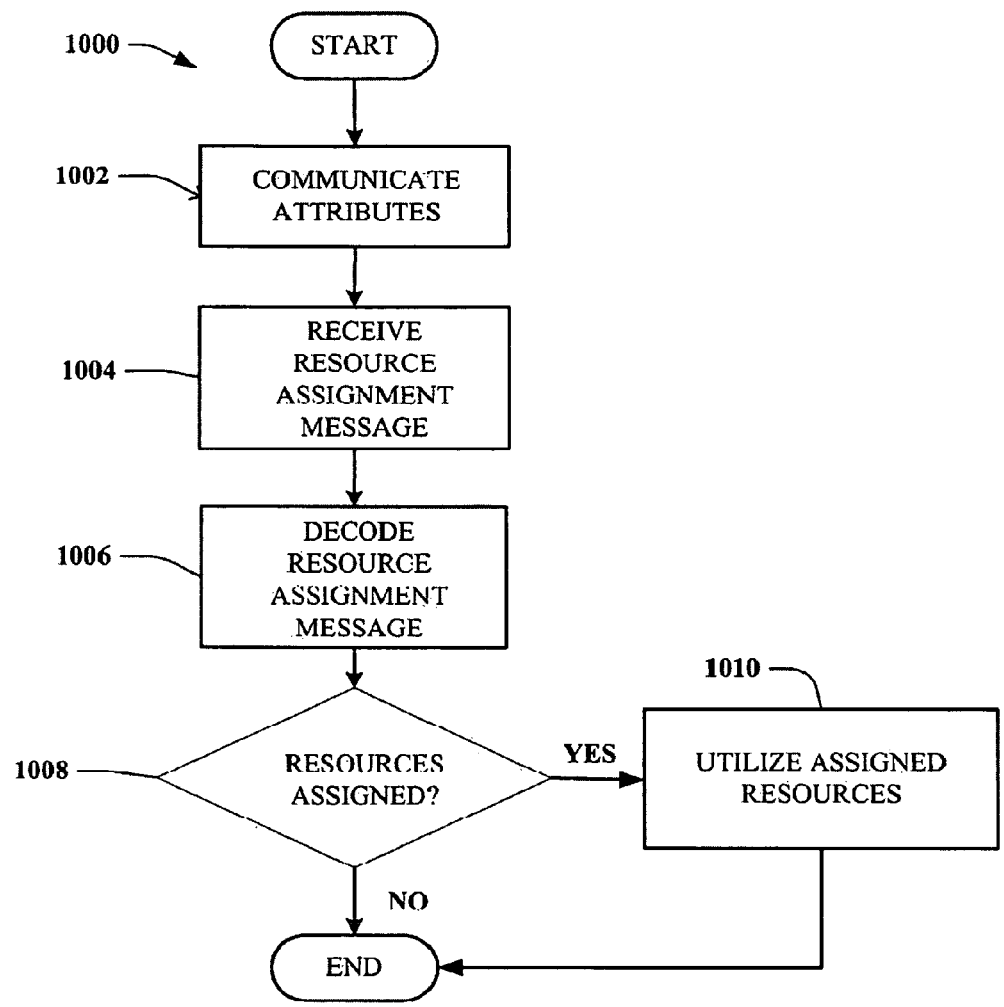
FIG. 10 illustrates a flow chart detailing a method of receiving information regarding assigned resources at an Access Terminal (AT).

FIG. 10 is a flow chart that illustrates a method of receiving resource assignment messages in accordance with an aspect. The method starts at 1002 wherein a terminal communicates its attributes to a serving base station within a cell. At 1004, it receives a resource assignment message from a base station serving the cell. The base station can associate the terminal with an existing group within the cell in order to communicate the resource assignment message to the terminal. In accordance with different aspects, the resource assignment message can be a bit mask comprising as many bits as the number of terminals within the group comprising the terminal. At 1006, the terminal decodes a received resource assignment message to determine which, if any, resources have been assigned to it. For example, if the resource assignment message is a bit mask then the value of bits within the bit mask can indicate to the terminal if any resources have been assigned to it. Accordingly at 1008, the terminal determines if any resources have been assigned to it. If resources have been assigned, at 1010 the assigned resources are utilized for communications. If no resources are assigned, the process terminates at the stop block.

The data transmission techniques described herein may be implemented by various means. For example, these techniques may be implemented in hardware, firmware, software, or a combination thereof. For a hardware implementation, the processing units used for data transmission at a transmitter or data reception at a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory and executed by a processor. The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for communicating resource assignment messages, comprising:
    grouping access terminals into a plurality of groups based upon similarity of attributes associated with the terminals, different groups in said plurality of groups being associated with resource assignment messages of different sizes; and
    transmitting resource assignment messages to different groups, a resource assignment message transmitted to an individual group being of a size associated with the individual group to which the resource assignment message is transmitted and using at least one of a coding or a modulation based on attributes associated with access terminals comprised within the individual group, said transmitting resource assignment messages including transmitting a bit mask to a group conveying resource assignment information for the group to which the bitmask is transmitted, said bit mask being an assignment message including a single bit for each access terminal in the group to which the message is transmitted, the value of the bit associated with an individual access terminal indicating if any resources have been assigned to the associated individual access terminal.

2. The method of claim 1,
    wherein the attributes are associated with SNR (signal to noise ratio) of the access terminals; and
    wherein at least one of the coding or modulation used for an assignment message transmitted to a group is different from the coding or modulation used for an assignment message transmitted to another group having different attributes.

3. The method of claim 1, wherein resource assignment messages transmitted to different groups having different SNR values are transmitted with different power.

4. The method of claim 3, further comprising dynamically assigning a new terminal conducting a handoff to one of the plurality of groups based on similarity of attributes of the new terminal and the access terminals in said one of the plurality of groups.

5. The method of claim 4, wherein the attributes are SNR values and difference in SNR values of the new terminal and the group to which it is assigned is less than or equal to 6 dB.

6. The method of claim 3, further comprising dynamically forming a new group comprising at least a new terminal conducting a handoff if the attributes of the new terminal are not similar to the attributes of the access terminals in said plurality of groups.

7. The method of claim 6, the attributes are SNR values associated with the terminals and the new group is formed when the difference in SNR values of the new terminal and the access terminals in said plurality of groups is greater than or equal to 3 dB.

8. The method of claim 1, wherein grouping access terminals into the plurality of groups includes grouping access terminals with lower SNR values into smaller size groups than access terminals with higher SNR values; and wherein resource assignment messages transmitted to groups comprising access terminals with higher SNR values are transmitted with lower power than resource assignment messages transmitted to groups comprising access terminals with lower SNR values.

9. The method of claim 1, wherein grouping access terminals into the plurality of groups includes grouping access terminals with low SNR values into smaller groups than access terminals with higher SNR values.

10. The method of claim 1 further comprising the steps of:
detecting variations in the attributes associated with one or more terminals in a specified group;
comparing the attributes with one or more thresholds associated with the group; and
removing the one or more terminals from the group if their attributes vary beyond the thresholds.

11. The method of claim 10, further comprising:
comparing the attributes of the one or more terminals removed from the group to attributes of one or more other groups in order to determine if the one or more terminals can be associated with one of the other groups.

12. The method of claim 11, further forming one or more new groups if the attributes of the one or more access terminals do not match the attributes of one or more other groups.

13. The method of claim 1, wherein transmitting resource assignment messages to different groups includes:
transmitting a first resource assignment message to a first group in said plurality of groups, said first resource assignment message being of a first size, said first size being associated with the first group and being the size of resource assignment messages transmitted to the first group; and
transmitting a second resource assignment message to a second group in said plurality of groups, said second resource assignment message being of a second size, said second size being different from said first size, said second size being associated with the second group and being the size of resource assignment messages transmitted to the second group.

14. The method of claim 13,
wherein said first assignment message is a broadcast message transmitted to the first group; and
wherein said second assignment message is a broadcast message transmitted to the second group.

15. The method of claim 13, wherein the first assignment message includes separate assignment information for each member of the first group.

16. The method of claim 15, wherein said second assignment message includes separate assignment information for each member of the second group.

17. The method of claim 15, wherein said separate assignment information is one bit value.

18. The method of claim 13,
wherein grouping access terminals into the plurality of groups includes assigning an access terminal to one of said first and second groups; and
wherein said first and second sizes are fixed prior to assignment of said access terminal to one of said first and second groups.

19. An apparatus for conveying information regarding resource assignments within a communication system comprising:
a receiver that receives a signal from one or more access terminals within a cell serviced by an access point;
a memory that stores attributes associated with the one or more access terminals, or assignment information;
a processor that groups the one or more access terminals into a plurality of groups based on similarity of the attributes, different groups in said plurality of groups being associated with resource assignment messages of different sizes; and
a transmitter for transmitting resource assignment messages to different groups, a resource assignment message transmitted to an individual group being of a size associated with the group to which the assignment message is transmitted and using at least one of a coding or modulation based on attributes associated with access terminals included within the individual group; and
wherein said transmitter is configured to transmit a bit mask as the assignment message to a group conveying resource assignment information for the group to which the bit mask is transmitted, said bit mask being an assignment message that includes a single bit for each access terminal in the group to which the assignment message is transmitted, the value of the bit associated with an individual access terminal indicating if any resources have been assigned to the associated individual access terminal.

20. The apparatus of claim 19, wherein the attributes are associated with SNR (signal to noise ratio) of the access terminals; and
wherein transmission of the resource assignment message to the individual group is made at a power level that is a function of the attributes associated with the access terminals in the individual group.

21. The apparatus of claim 19, wherein the bit mask is N bits long where N is the number of access terminals contained within a group to which the bit mask is transmitted.

22. The apparatus of claim 19, wherein said processor is configured to group access terminals with low SNR values into smaller groups than access terminals with higher SNR values; and
wherein the processor conveys resource assignment information to the access terminals via the value of bits comprised within the bit mask.

23. The apparatus of claim 19, wherein said processor is configured to group access terminals with lower SNR values into smaller groups than access terminals with higher SNR values; and
wherein said transmitter is configured to transmit resource assignment messages to groups comprising access terminals with higher SNR values at lower power than resource assignment messages to groups comprising access terminals with lower SNR values.

24. The apparatus of claim 23, wherein the resource assignment messages are transmitted to the plurality of groups based on SNR conditions associated with respective groups.

25. A non-transitory computer readable medium having stored thereon computer executable instructions for performing the steps of:
grouping access terminals into a plurality of groups of different sizes based upon similarity of attributes received from the access terminals; and
transmitting resource assignment messages to different groups, a resource assignment message transmitted to an individual group being of a size associated with the individual group to which the resource assignment message is transmitted and using at least one of a coding or a modulation based on attributes associated with access terminals within the individual group, said transmitting resource assignment messages including transmitting a bit mask to a group conveying resource assignment information for the group to which the bitmask is transmitted, said bit mask being an assignment message that includes a single bit for each access terminal in the group to which the message is transmitted, the value of the bit associated with an individual access terminal indicating if any resources have been assigned to the associated individual access terminal.

26. The non-transitory computer readable medium of claim 25, further comprising:
   instructions for customizing resource assignment messages for transmitting to each group based on SNR (signal to noise ratio) associated with access terminals within the group; and
   instructions controlling the coding or modulation used for an assignment message transmitted to the individual group to be different from the coding or modulation used for an assignment message transmitted to another group having different attributes.

27. The non-transitory computer readable medium of claim 25, wherein the attributes are associated with SNR of the access terminals; and
   wherein the non-transitory computer readable medium includes instructions for transmitting a resource assignment message to the individual group at a power level that is a function of the attributes associated with the access terminals in the particular individual group.

28. The non-transitory computer readable medium of claim 27, comprising further instructions wherein a first resource assignment message targeted to a first group is transmitted using channel coding and modulation of a first value of spectral efficiency and a second resource assignment message targeted to a second group is transmitted using channel coding and modulation of a second value of spectral efficiency, the second value being smaller than the first value when an average received SNR value of the first group is higher than an average received SNR value of the second group.

29. The non-transitory computer readable medium of claim 25, wherein instructions for transmitting resource assignment messages further comprises instructions for transmitting said bit mask to all the access terminals within a group.

30. The non-transitory computer readable medium of claim 29, further comprising instructions for generating the bit mask with as many bits as a number of access terminals constituting the group to which the bit mask is being transmitted.

31. The non-transitory computer readable medium of claim 29, wherein instructions for grouping access terminals into a plurality of groups of different sizes include instructions for grouping access terminals with lower SNR values into smaller groups than access terminals with higher SNR values; and
   wherein the resource assignment message is conveyed to the access terminals in the form of bits within the transmitted bit mask.

32. The non-transitory computer readable medium of claim 25, further comprising instructions for dynamically assigning a new terminal conducting a handoff to one of the plurality of groups based on similarity of attributes of the new terminal and the access terminals in said one of the plurality of groups.

33. A method of receiving resource assignment information comprising:
   associating an access terminal with a group, from a plurality of groups, based on similarity of attributes associated with the access terminals, different groups in said plurality of groups corresponding to resource assignment messages of different sizes;
   receiving a resource assignment message which is customized for the group with which the access terminal is associated based on the similar attributes of the access terminals in the group, said received resource assignment message conveying resource assignment information for the group with which said access terminal is associated and being of the size corresponding to the group with which the access terminal is associated, said resource assignment message being a bit mask that includes a single bit for each access terminal in the group with which the access terminal is associated, the value of the bit associated with an individual access terminal indicating if any resources have been assigned to the associated individual access terminal; and
   determining from the value of the bit associated with the access terminal in the assignment message if a resource has been assigned to the access terminal.

34. The method of claim 33, wherein the attributes comprise SNR (signal to noise ratio) information of the access terminal.

35. The method of claim 34, wherein the resource assignment message is based on SNR information transmitted from said access terminal.

36. The method of claim 35, wherein the bit mask comprises a predetermined number of one or more bits, different size bit masks corresponding to different groups in said plurality of groups.

37. The method of claim 36, wherein the number of bits in the bit mask corresponding to the group corresponds to a number of access terminals associated with the group.

38. The method of claim 36, wherein access terminals having low SNR values are grouped in groups that are smaller than groups of access terminals having higher SNR values.

39. An access terminal for receiving resource assignment information within a communication system, the access terminal comprising:
   a transmitter;
   a memory that stores attributes or received assignment information;
   a processor that associates the access terminal with a group, from a plurality of groups, based on similarity of the attributes associated with the access terminal, different groups in said plurality of groups corresponding to resource assignment messages of different sizes;
   a receiver for receiving a resource assignment message which is customized for the group with which the access terminal is associated based on the similar attributes of the access terminals in the group, said received resource assignment message conveying resource assignment information for the group with which said access terminal is associated and being of a size corresponding to the group with which the access terminal is associated, said resource assignment message being a bit mask that includes a single bit for each access terminal in the group with which the access terminal is associated, the value of the bit associated with an individual access terminal indicating if any resources have been assigned to the associated individual access terminal; and
   wherein said processor determines from the value of the bit associated with the access terminal in the received assignment message if a resource has been assigned to the access terminal.

40. The access terminal of claim 39, wherein the attributes are associated with SNR (signal to noise ratio) of the access terminal.

41. The access terminal of claim 39, wherein the resource assignment message is based on SNR information transmitted from said access terminal.

42. The access terminal of claim 39, wherein the number of bits in the bit mask being the same as the number of access terminals in the group with which the access terminal is associated.

43. The access terminal of claim 42, wherein the processor decodes resource assignment information associated with the access terminal based on the value of the bit corresponding to the access terminal that is included in the bit mask.

44. A non-transitory computer readable medium having stored thereon computer executable instructions for controlling an access terminal to perform the steps of:

associating the access terminal with a group, from a plurality of groups, based on similarity of attributes associated with the access terminals in the groups, different groups in said plurality of groups corresponding to resource assignment messages of different sizes;

receiving a resource assignment message which is customized for the group with which the access terminal is associated based on the similar attributes of the access terminals in the group, said received resource assignment message conveying resource assignment information for the group with which said access terminal is associated and being of the size corresponding to the group with which the access terminal is associated, said resource assignment message being a bit mask that includes a single bit for each access terminal in the group with which the access terminal is associated, the value of the bit associated with an individual access terminal indicating if any resources have been assigned to the associated individual access terminal; and determining from the value of the bit associated with the access terminal in the received resource assignment message if a resource has been assigned to the access terminal.

45. The non-transitory computer readable medium of claim 44, wherein the transmitted attributes comprise SNR information of the access terminal.

46. The non-transitory computer readable medium of claim 44, wherein the number of bits in the bit mask being the same as the number of access terminals in the group associated with said access terminal.

47. The non-transitory computer readable medium of claim 44, further comprising instructions for controlling said access terminal to associate with an existing group of access terminals if a difference between an SNR value of the access terminal and access terminals in the existing group is less than or equal to 6 dB.

48. The non-transitory computer readable medium of claim 47, further comprising instructions for controlling said access terminal to associate with another group if number of access terminals within the existing group has reached a predetermined threshold.

49. The non-transitory computer readable medium of claim 44, wherein said bit mask includes a predetermined number of one or more bits, different bit masks corresponding to different groups of access terminals.

50. The non-transitory computer readable medium of claim 49, further comprising instructions to determine assignment of one or more resources based on the value of one single bit in the bit mask.

* * * * *